Feb. 9, 1932.　　　　B. D. DYKES　　　　1,844,916
ELECTRICAL TERMINAL AND TERMINAL CONNECTION
Filed Feb. 18, 1928
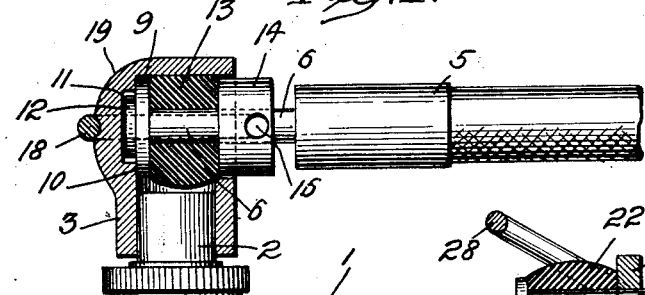
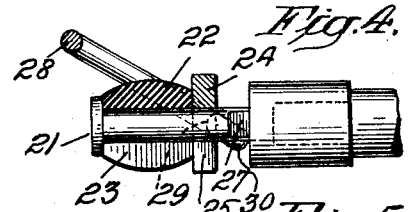
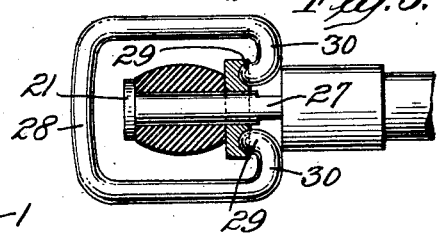
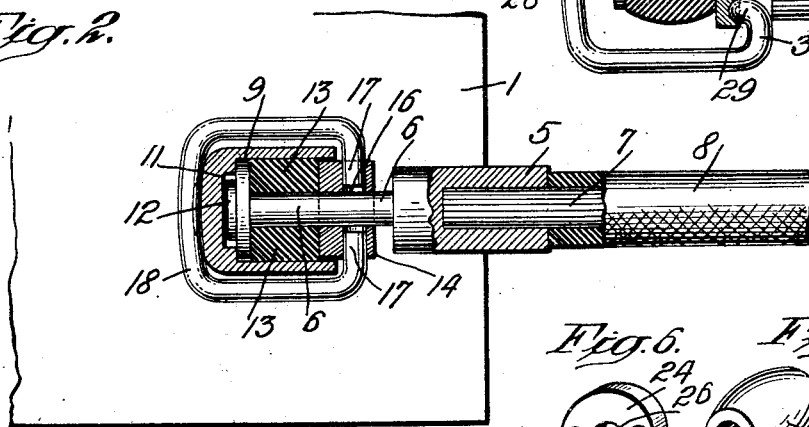
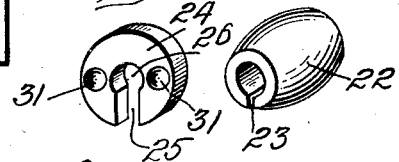
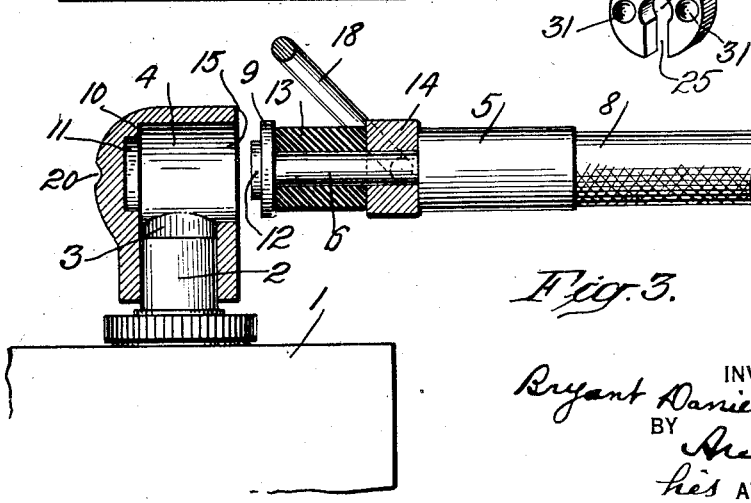
INVENTOR
Bryant Daniel Dykes
BY Archibald Cox
his ATTORNEY Patented Feb. 9, 1932

1,844,916

UNITED STATES PATENT OFFICE

BRYANT DANIEL DYKES, OF MILBURN, NEW JERSEY, ASSIGNOR OF ONE-HALF TO HOWARD E. WATKINS, OF SUMMIT, NEW JERSEY; CHATHAM PHENIX NATIONAL BANK & TRUST COMPANY EXECUTOR OF SAID HOWARD E. WATKINS, DECEASED

ELECTRICAL TERMINAL AND TERMINAL CONNECTION

Application filed February 18, 1928. Serial No. 255,308.

This invention relates to electrical terminals and terminal connections, and more particularly relates to storage battery and cable terminals, and to a connection therefor.

Due to the fact that storage batteries require recharging, repairing and replacement, it is customary to connect the cables of the electrical system in which they are used to the battery terminals in a detachable manner. Obviously, the desideratum is to provide means whereby a non-corroding, positive, and durable connection, which will not arc under sudden heavy load, may be made readily and easily between the terminals of the storage battery and the conductors or cables of the electrical system, and a connection which may as readily and easily be severed, without threatening damage to the battery or to the connecting means, and this, generally, is the main object of this invention.

A further object of my invention is to provide an improved battery terminal and an improved cable terminal adapted to provide a connection of the character referred to.

Other objects of this invention will be in part obvious and in part pointed out hereinafter.

In accordance with my invention I prevent corrosion at the terminals by providing a connection which excludes all air, battery gases, and liquids from the locality of the electrical contact between the battery and cable terminals, the place of such contact being preferably in the interior of a socket in a battery terminal member, and a rubber element, which is non-corrosive, being provided, which seals the contact in the socket in an air and water tight manner. This rubber element is so devised and mounted that when the connection is made it not only seals the socket but also, in co-action with a terminal connecting link, maintains the terminals in positive electrical contact under continuous resilient pressure. The arrangement is such that by merely swinging the link into or out of engagement with the battery terminal the connection may be made or severed readily and easily without force and without the use of tools. Thus, nuts, bolts, metal springs, and other elements which are apt to become corroded and destroyed and made inneffective by sulphate from the battery, are entirely eliminated. By eliminating the necessity for hammering, prying, or otherwise forcing the connection together or apart, the battery and parts are not subject to injury, which would be apt to result from such treatment.

My invention accordingly consists in the features of construction, arrangement of parts, and combination of elements now to be described more specifically by means of illustrative examples of certain possible embodiments of my invention, and the scope of the application of which will be brought out in the appended claim.

Reference is now made to the accompanying drawings, forming a part of this application, and illustrating certain possible embodiments of this invention, and in which:—

Fig. 1 is a vertical cross sectional view of a terminal connection, embodying my invention, applied to a storage battery;

Fig. 2 is a horizontal cross sectional view of the same;

Fig. 3 is a view similar to Fig. 1, but shows the conducting cable disconnected from the battery terminal;

Fig. 4 is a vertical cross sectional view of a conductor or cable terminal member of slightly modified form;

Fig. 5 is a sectional view thereof taken on another plane;

Fig. 6 is a perspective view of the collar element of the modified form of terminal member, and Fig. 7 is a perspective view of the sealing and contact maintaining member.

Similar reference characters refer to similar parts throughout the several views of the drawings.

Referring to the drawings, 2 indicates a conventional stud of a storage battery, represented at 1. My improved battery terminal has a tubular neck 3 which telescopes snugly over the stud 2 and is preferably brazed or soldered thereto. A socket 4 is formed in the head of the terminal, the socket being preferably circular in cross-section, and, if desired, having a depression or recess 11 on the innermost wall of the socket, leaving an annular surface 10 thereabout. Either all or a part of the surface of this innermost wall may be utilized as the operative contact area of the battery terminal.

The cable terminal comprises a base 5 to which the conductor or core 7 of the cable 8 is secured in electrical contact therewith. For instance the end of the conductor may be soldered in a hollow formed therefor in base 5. Extending from base 5 is a rod or pin 6 which penetrates a resilient, somewhat elongated, and circular member 13, disposed between a disk or collar 14 slidably carried on pin 6 and a metal stop collar or disk 12 secured firmly to the end of pin 6. If desired a metal washer 9 may be disposed between element 13 and head 12.

The cable terminal is adopted to be inserted endwise into the socket of the battery terimnal, and the connection is made by swinging a connecting link 18, which has ends 17 pivoted in recesses 16 formed therefor in collar 14, over the battery terminal head until it seats in the notch 20. Link 18 is of such size that as it rides over the head of the battery terminal it will draw the collar 14 outwardly on pin 6, compressing the resiliently expansible element 13 between the collar 14 and washer 9 and causing element 13 to expand radially into tight contact with the wall of socket 4, establishing an air and water tight seal behind the contacting parts at the interior of the socket. At the same time element 13 presses either or both the parts 9 and 12 into tight and positive electrical contact with the socket surfaces at 10 and 11. Preferably the collar 14 does not touch the battery terminal head. The connection may be severed by merely releasing link 18 from the battery terminal head and drawing the cable terminal out of the socket of the battery terminal. Preferably the battery terminal head is rounded, as at 19, to permit proper manipulation of the link 18.

As a possible modification of the construction, instead of the ends of the link 18 being seated in radial aperatures 16 in collar 14, a link 28 may be provided which has rounded ends 29 removably seating in cup sockets 31 formed in the rear face of a collar 24. The collar 24 may be provided with a slot 25 extending to the larger center perforation 26, so that the collar may be slid radially upon the pin at a reduced portion 27 at the base of the pin, and then slid outwardly thereon, thus permitting ready removal and replacement of the collar. The resilient, expansible member, such as 22, may be slit as at 23 to permit it to be placed on or removed from pin 21, readily and easily. This element may be somewhat barrel-shaped, if desired, to accentuate its expansion into sealing engagement with the walls of the battery terminal socket when it is compressed between the collar 24 and head 21 of the pin. If desired, the washer 9 may be omitted, and the electrical contact established only between the head 21 and the depression 11 in the socket.

It will be obvious from the above that my connection establishes an air-tight, non-corrosive and positive contact, by means of a rubber sealing and contact maintaining element which is unaffected by battery acid. The connection may be made and severed most readily and easily, without requiring the use of tools or hammering, prying or similar rough treatment which entails delay and would be apt to harm or even destroy the battery or break one or more parts of the connection. There are no nuts, bolts or metal springs to become corroded and destroyed and made inoperative by sulphate from the battery. A positive contact is maintained which will not arc under sudden heavy load, yet the contact may be severed in an instant without the use of tools, which feature is important when a short circuit may occur.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:

An electrical connection of the character described comprising in combination, a terminal consisting of a socket member, the bottom of said socket serving as a contact surface, a second terminal consisting of a rod-like member the end of which is adapted to bear against the bottom of the socket to form an electrical connection with it, a resilient member mounted on the rod within the socket, a collar loosely mounted on the rod at the rear of the resilient member, and means connected with the collar and engageable with the outer surface of the socket for forcing the collar against the resilient member to cause the latter to hold the rod in electrical contact with the bottom of the socket, said collar serving to compress the resilient member axially and thereby expand it laterally to force its periphery into contact with the inner surface of the walls of the socket.

This specification signed this 16th day of February, 1928.

BRYANT DANIEL DYKES.